UNITED STATES PATENT OFFICE.

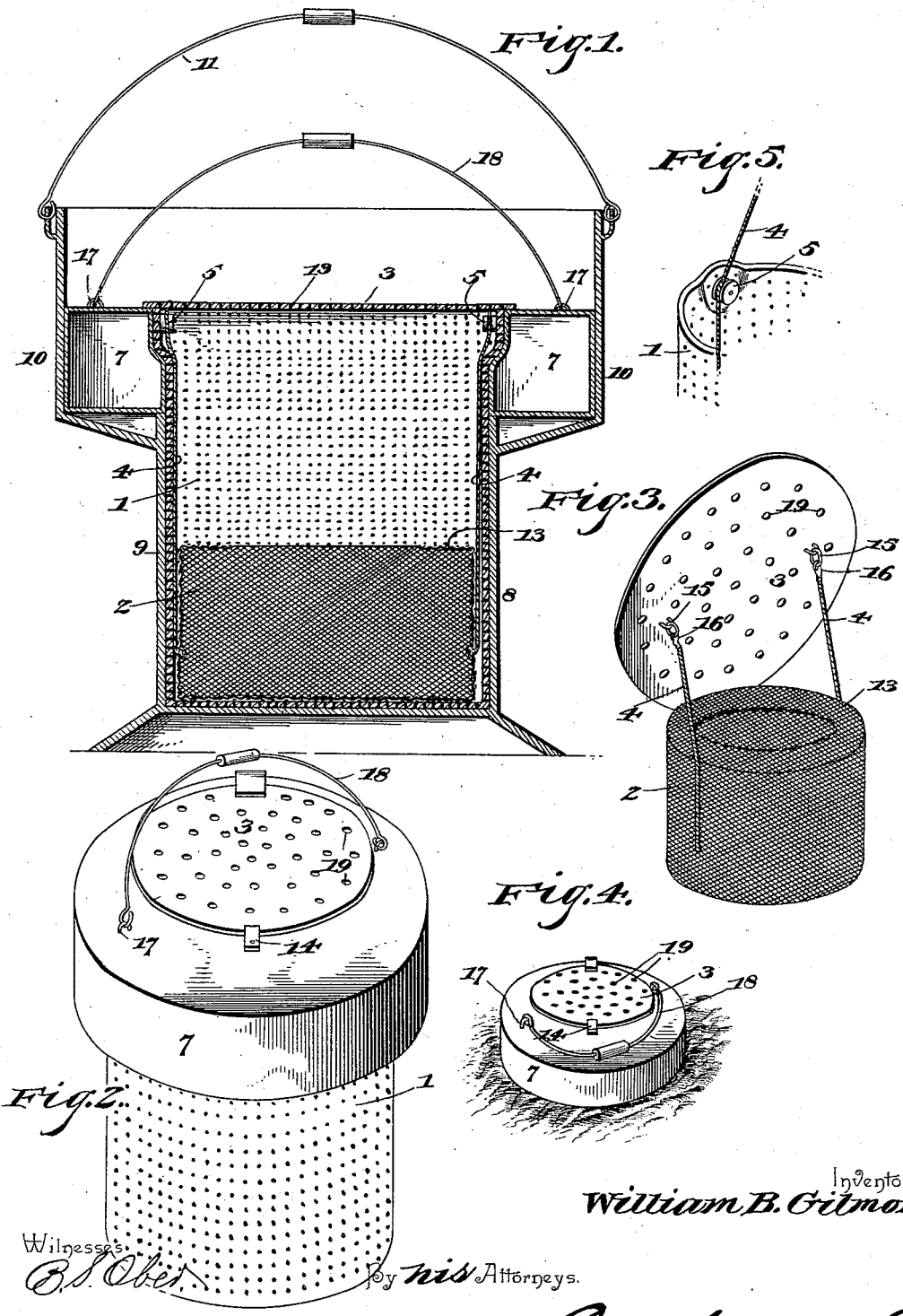

WILLIAM B. GILMORE, OF COLUMBIA, ILLINOIS.

BAIT-RECEPTACLE.

SPECIFICATION forming part of Letters Patent No. 531,112, dated December 18, 1894.

Application filed April 25, 1894. Serial No. 508,979. (No model.)

*To all whom it may concern:*

Be it known that I, WILLIAM B. GILMORE, a citizen of the United States, residing at Columbia, in the county of Monroe and State of Illinois, have invented a new and useful Bait-Receptacle, of which the following is a specification.

My invention relates to an improvement in those bait receptacles which are formed of perforated material and provided with a float, whereby the receptacle may be placed in a bucket of water and allowed to float therein, thus keeping the bait, usually minnows, alive; and the invention consists of certain improvements in the construction of the receptacle, whereby the bait may be reached with a facility greater than ordinarily.

The invention also consists in an improved construction of bucket for carrying the bait receptacle, and by which the receptacle is supplied with water and held comparatively stationary.

In the accompanying drawings: Figure 1 represents a vertical section of a bait receptacle and its bucket, and constructed after the manner of my invention; Fig. 2, a perspective view of the bait receptacle detached from the bucket; Fig. 3, a view illustrating the bait-cup and the receptacle lid, showing the connection and co-operation between the two; Fig. 4, a reduced view showing the use of the device independent of the bucket; Fig. 5, a detail of the pulleys for supporting the bait-cup.

The reference numeral 1 indicates the bait receptacle, which consists of a cylindrical sheet-metal vessel, perforated throughout its extent and provided with an open upper end. Located within the vessel 1, and capable of vertical movement therein, is the bait receptacle proper, 2, which is also cylindrical in shape, and of a vertical extent equal to about one-third that of the vessel 1. This device, receptacle 2, is substantially a cup, and will be so termed hereinafter, and is formed of woven wire, as is the vessel or receptacle 1. The upper end of the cup 2 is provided with the inwardly-extending flange 13, the remainder of the upper end being left open so as to permit the introduction and removal of the bait.

Hinged to the upper and open end of the receptacle 1 is the circular lid 3, which is capable of swinging on its hinges to cover or uncover the receptacle 1, and has attached thereto the catch 14, whereby it is secured in place. The lid 3 is formed with a series of perforations 19, throughout its extent, which serve to allow free circulation of air and to keep the interior of the device cool.

4 indicates two downwardly-extending cords, which pass from the lid 3, down over the pulleys 5, and continue to the lower portion of the bait-cup 2, to which they are attached by passing them through the sides of the cup. The cords 4 are secured to the lid 3 by means of the pivotally-attached links 15, secured to the lid and provided for connection with the snap-hooks 16, of the upper ends of the cords. By these means the cup 2 can be detached from the lid and the latter raised independently of the cup. The pulleys 5 are one for each cord, and arranged in recesses in the receptacle 1, and on opposite sides thereof. Over these pulleys the cords are adapted to pass and by their means the cup 2 can be raised without friction. The cords 4 are two in number, and are arranged directly opposite each other, so that they will balance the bait-cup when supported thereby, while the pulleys 5 are also oppositely arranged so as to properly guide and retain the cords.

7 indicates the float, which consists of a circular hollow rim, formed of tin or any other suitable material, and which is adapted to embrace the upper end of the receptacle 1. The float 7 is secured to the receptacle 1 by any suitable means, and operates to support it in the water, as ordinarily. The cords 4 are of such a length that they will permit the bait-cup to rest on the bottom of the receptacle 1, when the lid 3 is disposed horizontally, or closing the receptacle 1, and when the lid is raised the cord will be drawn through the eyes 5 and the bait-cup raised also. When the lid is raised to a vertical position, the bait-cup will be raised to the level of the upper end of the receptacle 1. Owing to this construction the bait contained in the cup 2 may be kept down in the lower portion of the receptacle, and submerged in the water, and when the lid is raised the cup will be raised similarly, so as to place it on a level with the upper edge of the receptacle 1, and in position to be easily reached by the operator. Secured to the oppositely-arranged eyes 17 of the float 7, is the handle or bail 18, by which the float 7 and receptacle 1 may be lifted. It will be noticed that this bail lies inward of the periphery of the float 7, and this for a purpose hereinafter explained.

8 indicates the bucket which I provide for containing the receptacle 1 and its attachments, and this consists of an imperforate sheet-metal device, having the main portion 9 adapted for, and of such a size as to permit, the reception of the vessel 1. Formed above the main portion 9 is the enlarged annular portion 10, which is concentric with the part 9, and which is adapted for the reception of the float 7. This portion 10 is of a depth equal to about twice that of the float 7, and is arranged to leave a space above the receptacle 1, in which space it will be possible to put ice for prolonging the lives of the bait.

Secured to the part 10, of the bucket 8, is the handle 11, by which the bucket may be lifted or otherwise handled. The bucket 8 should be of a size which will permit the easy insertion of the receptacle 1.

In use, the bait-cup 2 is filled with the bait used, and this is generally minnows, and the lid 3 closed, which will be followed by a downward movement of the cup, as before explained. The bucket 8 is now partially filled with water, and the vessel or receptacle 1 inserted therein, whereupon the lid 3 may be raised or lowered at will. Should it be desired to use the receptacle 1 and its attachments without the bucket 8, the receptacle may be detached therefrom and placed in any body of water, as shown in Fig. 4. When so arranged, the float 7 will operate to support it and give it the proper degree of stability, allowing the lid 3 to be raised without disturbing the horizontal position of the device. Thus it will be seen that my device is susceptible of, and devised for, two different manners of use. When arranged in the bucket 8 the float 7 will have, perhaps, no function, and the bucket will be filled about half full of water, so that the bait-cup will be lifted above the same when the lid is raised. Now, when the arrangement is used independently of the bucket 8, and placed in a larger body of water, the float will operate to support it, and the lid 3 may be raised to bring the bait-cup within the operator's reach, as before described.

Having described my invention, what I claim is—

1. A bait receptacle, consisting of a vessel adapted to have water therein and having a lid hinged thereto, and a bait-cup located in the vessel and movable vertically therein and connected to the lid, whereby upon raising the lid the bait-cup will be correspondingly raised, substantially as and for the purpose described.

2. A bait receptacle, consisting of a cylindrical vessel adapted to have water therein and having a pulley secured on each of its upper opposite sides, a lid hinged to the upper end of the vessel, a bait-cup located in the vessel and movable vertically therein, and cords connected to the lid and to the bait-cup and passing over the pulleys on the receptacle, whereby upon raising the lid the bait-cup will be correspondingly raised, substantially as and for the purpose described.

3. A bait receptacle, consisting of a bucket adapted to be partially filled with water, a perforated vessel adapted to be arranged therein and to have the water circulate through it, a lid pivoted to the upper end of the vessel, and a perforated bait-cup located in the vessel and vertically movable therein and connected to the lid, whereby when the lid is raised the bait-cup will be correspondingly raised, substantially as and for the purpose described.

In testimony that I claim the foregoing as my own I have hereto affixed my signature in the presence of two witnesses.

WILLIAM B. GILMORE.

Witnesses:
JOS. M. ARMES,
EMIL HEER.